United States Patent
Jamison et al.

(10) Patent No.: US 7,460,352 B2
(45) Date of Patent: Dec. 2, 2008

(54) FLEXIBLE DIELECTRIC FILM AND METHOD FOR MAKING

(75) Inventors: Keith D. Jamison, Austin, TX (US); Martin E. Kordesch, The Plains, OH (US)

(73) Assignee: Faradox Energy Storage, Inc., Austin, TX (US)

( * ) Notice: Subject to any disclaimer, the term of this patent is extended or adjusted under 35 U.S.C. 154(b) by 440 days.

(21) Appl. No.: 11/328,323

(22) Filed: Jan. 9, 2006

(65) Prior Publication Data

US 2007/0159767 A1    Jul. 12, 2007

(51) Int. Cl.
*H01G 4/00* (2006.01)
*H01G 4/008* (2006.01)
*H01G 4/015* (2006.01)
*H01G 4/32* (2006.01)
*B32B 7/02* (2006.01)

(52) U.S. Cl. .............. 361/273; 361/301.5; 29/25.41; 29/25.42; 428/409

(58) Field of Classification Search ............. 361/273, 361/301.5; 29/25.41, 25.42; 428/409
See application file for complete search history.

(56) References Cited

U.S. PATENT DOCUMENTS

| 3,289,059 | A | * | 11/1966 | Bernard ............... 361/330 |
|---|---|---|---|---|
| 4,089,037 | A | * | 5/1978 | Rayburn ............... 361/305 |
| 4,443,359 | A | | 4/1984 | Shimizu et al. |
| 5,540,974 | A | * | 7/1996 | Hoseki et al. ............. 428/141 |
| 5,576,925 | A | | 11/1996 | Gorowitz et al. |
| 5,844,770 | A | * | 12/1998 | Fries-Carr et al. ......... 361/301.5 |
| 6,841,080 | B2 | | 1/2005 | Kingon et al. |
| 6,875,707 | B2 | | 4/2005 | Moore et al. |
| 6,894,335 | B2 | | 5/2005 | LaFleur |
| 6,894,887 | B2 | | 5/2005 | Arai et al. |
| 7,291,185 | B2 | * | 11/2007 | Shiota et al. .............. 29/25.03 |
| 2004/0207970 | A1 | * | 10/2004 | Shiota et al. .............. 361/271 |

* cited by examiner

*Primary Examiner*—Evan Pert
(74) *Attorney, Agent, or Firm*—Claude E. Cooke, Jr.; Burleson Cooke L.L.P.

(57) ABSTRACT

Flexible films or sheets for forming high-breakdown strength, high-temperature capacitors are disclosed. Amorphous metal oxides and nitrides, preferably $SiO_2$ or $HfO_2$, with a dielectric constant (k) greater than 2 and stacks of oxides and nitrides formed over conducting substrates may be formed. The dielectrics may be formed by reactive sputter deposition of the amorphous materials onto cooled substrates. The cooled substrate allows the films to be amorphous or nanocrystalline and results in films that can be flexed and that can be rolled into cylindrical shapes. An important application for these dielectrics is in high energy-density wound capacitors.

19 Claims, 5 Drawing Sheets

US 7,460,352 B2

FLEXIBLE DIELECTRIC FILM AND METHOD FOR MAKING

BACKGROUND OF THE INVENTION

1. Field of the Invention

This invention relates to electrical energy storage. More particularly, a flexible dielectric film that can be a component of a high energy density capacitor that can operate at high temperatures and method for making are provided.

2. Description of Related Art

Capacitors with high volumetric energy density, high operating temperature, low Equivalent Series Resistance (ESR), and long lifetime are critical components for pulse-power, automotive, and industrial electronics. The physical characteristics of the dielectric material in the capacitor are the primary determining factors for the performance of a capacitor. Accordingly, improvements in one or more of the physical properties of the dielectric material in a capacitor can result in corresponding performance improvements in the capacitor component, usually resulting in performance and lifetime enhancements of the electronics system or product in which it is embedded. Since improvements in capacitor dielectric can directly influence product size, product reliability, and product efficiency, there is a high value associated with such improvements.

Certain improvements in capacitor dielectric materials can be considered as enabling to a particular technology application. For example, capacitors with high dielectric strength, low ESR, and low dielectric dissipation factor will allow high frequency or pulse-power applications to be reduced to a practical size. High temperature (>150° C.) operation will greatly simplify next-generation electric vehicles. Improved dielectrics will enable the specific power and reliability of switching power supplies, power conditioners, and filters to be increased. Improved energy density will decrease the area presently devoted to capacitor devices on printed circuit boards, reducing the weight and size of power conditioning systems, power supplies and down-hole tools for use in oil or gas wells.

To reduce the size of a capacitor while retaining all other physical and electrical characteristics, either an increase in the capacitor dielectric constant or dielectric breakdown strength is necessary. Both are fulfilled with the development of new thin, flexible dielectrics having high voltage breakdown strength (in excess of 20 kV/mil or 8 MV/cm), a high dielectric constant (greater than 2) and a low ESR loss (less than 0.1%). Some applications additionally require a stable dielectric constant with no reduction in lifetime at temperatures exceeding 150° C.

Progress on several fronts has recently been made in the semiconductor industry, where there has been rapid development of new, extremely thin, low-k and high-k dielectrics used in semiconductor devices. The advanced materials and processes have yet to migrate into the specialty or general use "macroscopic" capacitor industry, due mostly to their application in a focused niche, their relatively high production cost, and the inability of the dielectric material to be "rolled up" to produce large capacitance discrete capacitors. There is a need to apply some of the recent advances in semiconductor capacitor development, coupled with innovative materials and deposition processes, toward the construction of high volumetric energy-density rolled capacitors.

High energy density, high voltage non-polar capacitors are conventionally made using a metalized polymer film that is wound into a cylindrical shape. In conventional wound capacitors, the dielectric material is typically a polymer film. Common polymer dielectric materials include polycarbonate, polyester, polypropylene, polystyrene, and polysulfone. Polymer dielectric-based foil capacitors are generally fabricated by placing alternating sheets of polymer and metal foil in a stack and rolling the stack into a tubular shape or depositing a metal film on one side of the polymer then rolling two stacked metalized polymer films into a tubular shape. Electrical wires are connected to each metal foil. The dielectric material exists in the form of self-supporting layers that are thick enough to sustain the necessary operating voltage (typically at least 3-6 micrometers). Unfortunately, the large thickness of the polymer sheets reduces the energy storage density. Usually the dielectric constant of these capacitors changes and the lifetime is shortened at temperatures in excess of 100-150° C. due to deficiencies in the polymer material. Alternately, two polymer films coated with a thin layer of metal (usually 17-100 nanometers thick) are wound into a tubular shape to form a capacitor. The thin metal film has the advantage of clearing any short that may form if the polymer dielectric breaks down during operation. This may extend the life of the capacitor and minimize the chances of catastrophic failure of the capacitor.

Diamond-like carbon (DLC) or amorphous ceramics as the dielectric material on a metal foil has been proposed in U.S. Pat. No. 5,844,770, which is hereby incorporated by reference herein. Other recent patents that disclose capacitors include U.S. Pat. No. 6,894,887 ("Multi-layer capacitor and method for manufacturing the same"), U.S. Pat. No. 6,894,335 ("Thin film capacitor having multi-layer dielectric film including silicon dioxide and tantalum pentoxide"), U.S. Pat. No. 6,875,707 ("Method of forming a capacitor dielectric layer"), and U.S. Pat. No. 6,841,080 ("Multi-layer conductor-dielectric oxide structure").

There is a specific need for flexible, high dielectric strength materials that can be formed into a capacitor with high breakdown voltage and high dielectric constant (resulting in high energy density) that operate at a higher temperature than a conventional capacitor. Methods for making the materials and integrating them into a capacitor structure are also needed.

Summary of Invention

Amorphous $SiO_2$, $HfO_2$ and other metal oxides with a dielectric constant (k) greater than 2 and stacks of amorphous oxides and nitrides, e.g. $SiO_2/Si_3N_4$, are disclosed as dielectric materials to make high breakdown strength, high energy density, high temperature capacitors. A flexible substrate comprised of an insulating polymer film coated with thin metal layers on both sides of the film and a process to deposit the amorphous oxides and oxide/nitride layers on the film to produce a material that can be rolled into cylindrical shapes is also disclosed.

DETAILED DESCRIPTION

Figure 1:
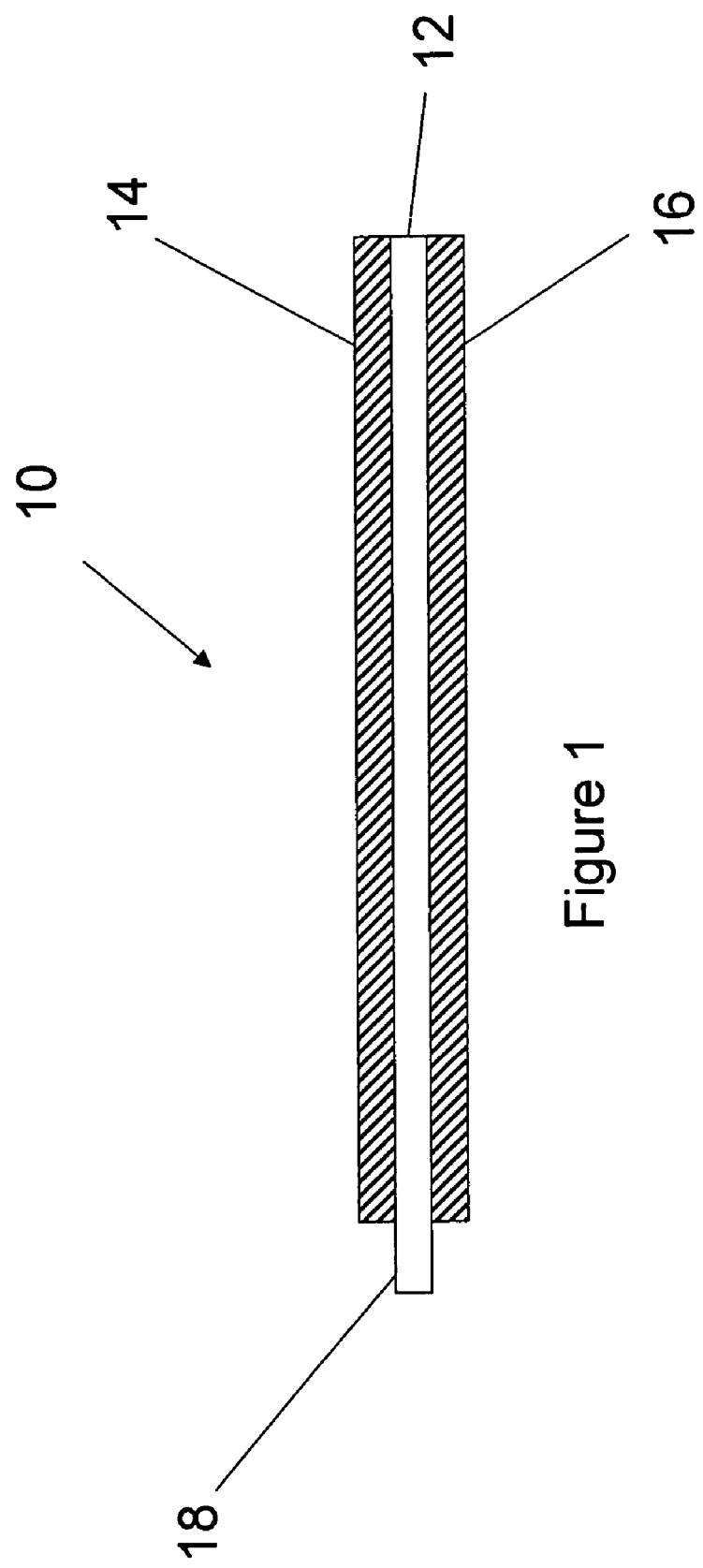
FIG. 1 is a cross-sectional view of a film dielectric having a flexible conducting film as a base for a dielectric.

FIG. 1 shows a flexible film to be used in constructing a rolled capacitor. Flexible conducting base film 12 is coated with dielectric film 14 and dielectric film 16. Flexible film 12 may be a metallic conductor, a conducting polymer, a metal-coated polymer, or other similar materials known to those skilled in the art. Dielectric films 14 and 16 are preferably films composed of amorphous oxides, nitrides, or alternating films of amorphous nitrides and oxides to be described in more detail hereinafter. Area 18 of the conductive base film 12 has been left uncovered with dielectric so that it may be used for electrical contact.

Figure 2:
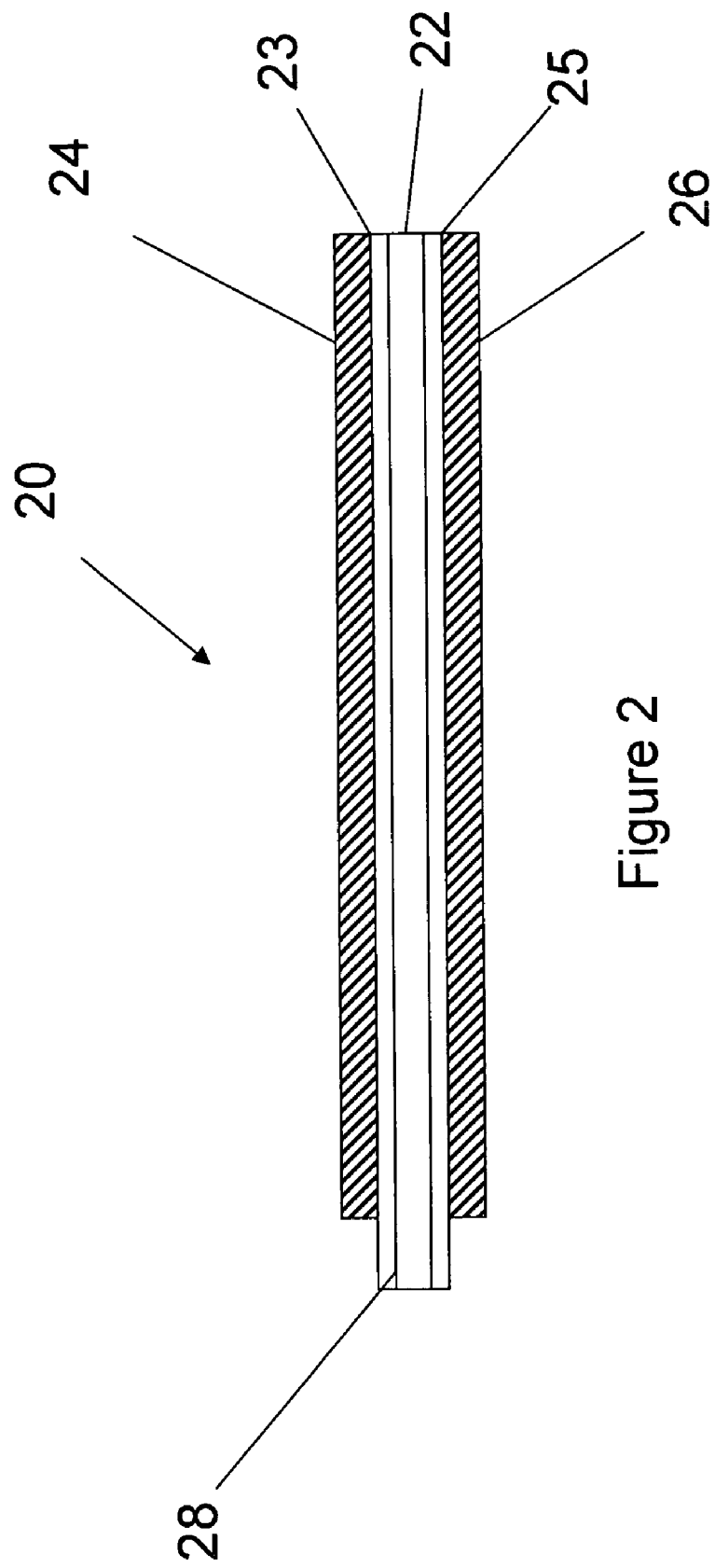
FIG. 2 is a cross-sectional view of a film dielectric having a flexible non-conducting film with a metallized layer as a base and serving as the electrode for a dielectric.

Referring to FIG. 2, flexible film 20 includes flexible insulating substrate 22, metallized layers 23 and 25 and dielectric layers 24 and 26. Area 28 of metallized layers 23 and 25 has been left uncovered to be used as an electrical contact area.

Figure 3:
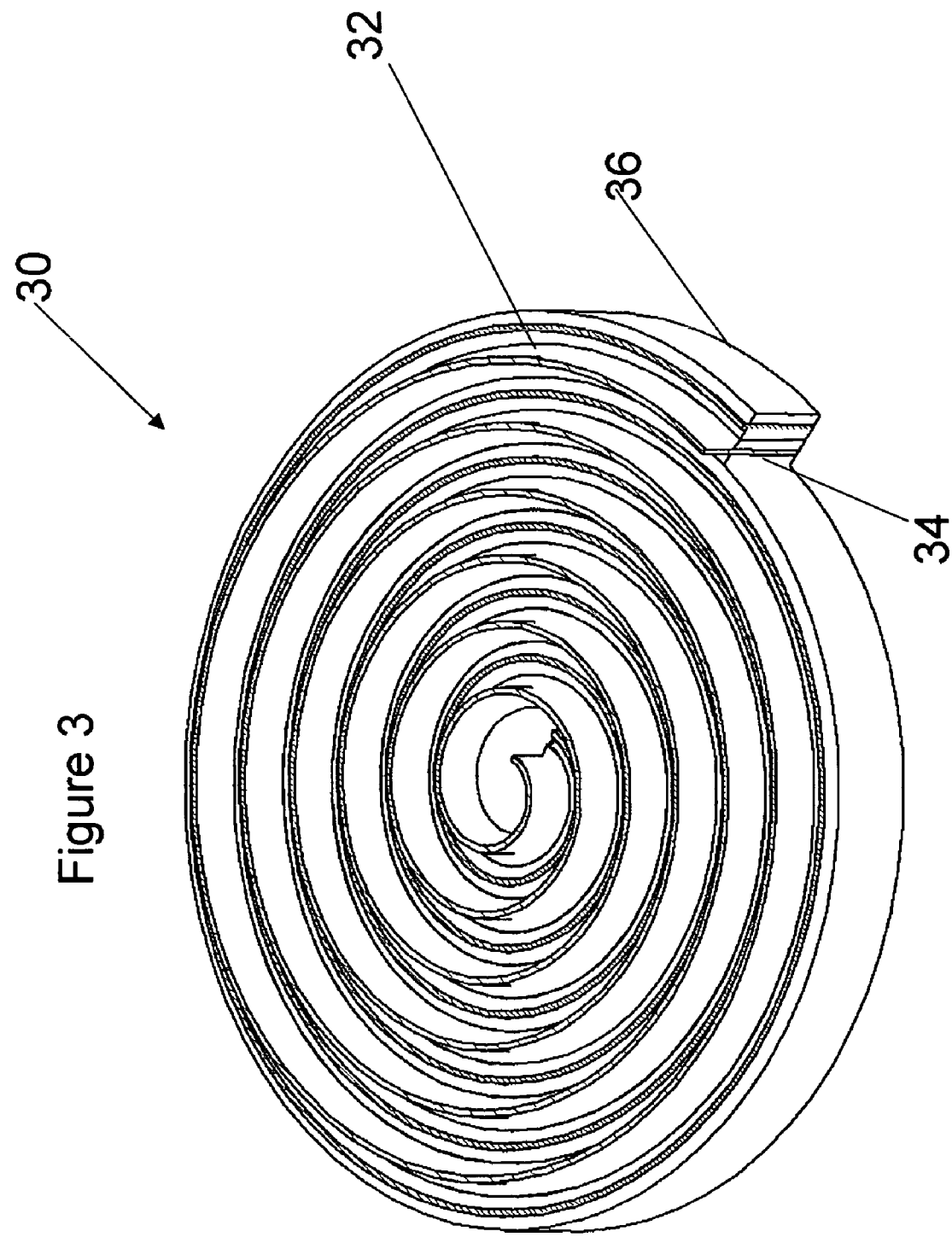
FIG. 3 is a cross-sectional view of a wound capacitor formed from flexible conducting and dielectric films.

Referring to FIG. 3, two dielectric-coated conducting layers have been placed on top of each other then wound or coiled to form capacitor 30. Conducting layer 32 having dielectric layers 34 and 36 have been wound into a spiral. FIG. 3 illustrates the cylindrical shape. Contacts to a conductive layer may extend vertically above the coil and another contact attached to the second dielectric-coated conducting layer may extend on the bottom side of the coil. A suitable length of the capacitor would be in the range of about 1-10 centimeters with about a 0.5-4 millimeter strip at the edge of the film that is left uncoated to provide a metal contact area to attach the conductor to one end of the coil. The size may be varied over a large range to satisfy requirements of the capacitor.

Figure 4:
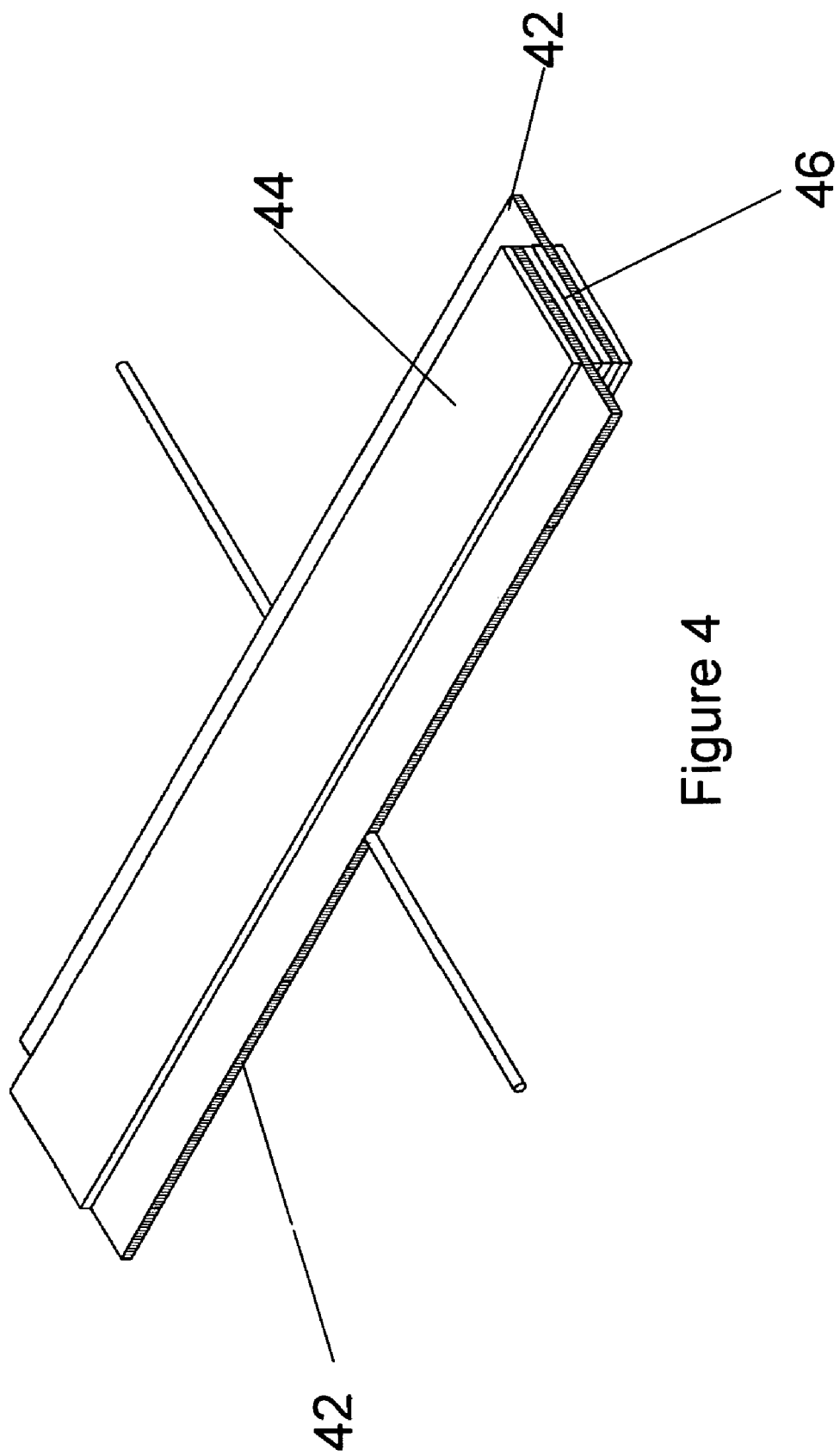
FIG. 4 is a perspective view of a stack of conducting and dielectric films for coiling into a capacitor.

FIG. 4 shows one embodiment of the roll capacitor of FIG. 3 before the formation of the roll or coil. Conductor layer 42, which may be either the conductor layer 12 of FIG. 1 or conductor layers 22, 23, 25 of FIG. 2, is shown after it has been coated with dielectric layers 44 and 46, which correspond to layers 14 and 16 of FIG. 1 or layers 24 and 26 of FIG. 2. In this embodiment, dielectric layers 44 and 46 are in contact in the roll, which has the effect of decreasing the probability of defects in the dielectric layer that may align causing a short circuit in the capacitor.

Conductive layer 12 of FIG. 1 may be a metal, a metal-coated polymer or a conductive polymer. Useful electrically conductive substrates may be formed from a metal foil comprising, but not limited to, aluminum, molybdenum, copper, stainless steel, silver, gold, titanium, and/or nickel either as the conductor or as the metal coating on a metal-coated polymer. Useful conductive polymers include, but are not limited to, poly(ethylene-dioxythiophene), polyaniline, and polypyrrole. The thickness of the metal substrate, metal coated polymer, or conducting polymer is preferably in the range of about 0.5 micrometers to 25 micrometers.

Preferably, the substrate of FIG. 2 will be formed from a capacitor-grade metallized polymer film, where the polymer may be polypropylene, polystyrene, polyimide, polysulfone or polyester, for example. Such metallized polymer films are available commercially. The thickness of the polymer layer in a polymer foil is preferably in the range from about 0.5 micrometers to about 25 micrometers. The metallized layer on the polymer to form the foil may have a thickness in the range of about 15 nanometers to about 100 nanometers. The metal layer may be thin so that any breakdown or arcing event will cause the metal to evaporate and prevent a short, allowing the capacitor to continue operating. The electrical sheet resistivity of the metal coating may be in the range from about 0.1 to 50 ohms per square. A preferred metal is aluminum.

The dielectric layer may be formed from amorphous oxides, amorphous nitrides, or multi-layer stacks of amorphous oxides and nitrides. A preferable dielectric material is amorphous silicon dioxide. The dielectric thickness may be in the range from about 0.1 micrometers to 3.0 micrometers. In practice, the films are made as thin as possible to maximize energy storage density and thick enough to have desired breakdown voltage. The films preferably will be able to be wound about a mandrel into a cylindrical capacitor shape without harming either the conductor or dielectric.

Depositing an amorphous dielectric on an electrically conductive substrate forms the dielectric film disclosed herein. The dielectric film is preferably deposited by radio frequency (RF) or pulsed DC reactive sputtering using a metal or semiconductor target in a background gas species to form the required oxide or nitride. Alternatively, an oxide and or nitride material may be deposited onto the electrically conductive substrate by means including any known physical and/or chemical deposition technique including, but not limited to, sputtering, e-beam deposition and chemical vapor deposition. Parts of the substrate may be transported under a mask during deposition of the dielectric to obtain an uncoated edge on the conductive substrate surface or any other desired pattern. Preferably, the substrate is kept in the temperature range between 0° C. to 200° C. during the deposition of the dielectric material.

Metallized polymer films and thin metal foils that may be used as the substrate can be purchased commercially. Conductive polymer films for capacitors are not routinely commercially available but can be fabricated. Preferably the conductor film is between about 1 and 15 centimeters wide. A mask may be used to avoid deposition of dielectric on about a 0.5-4-millimeter strip at the edge of the film.

Figure 5:
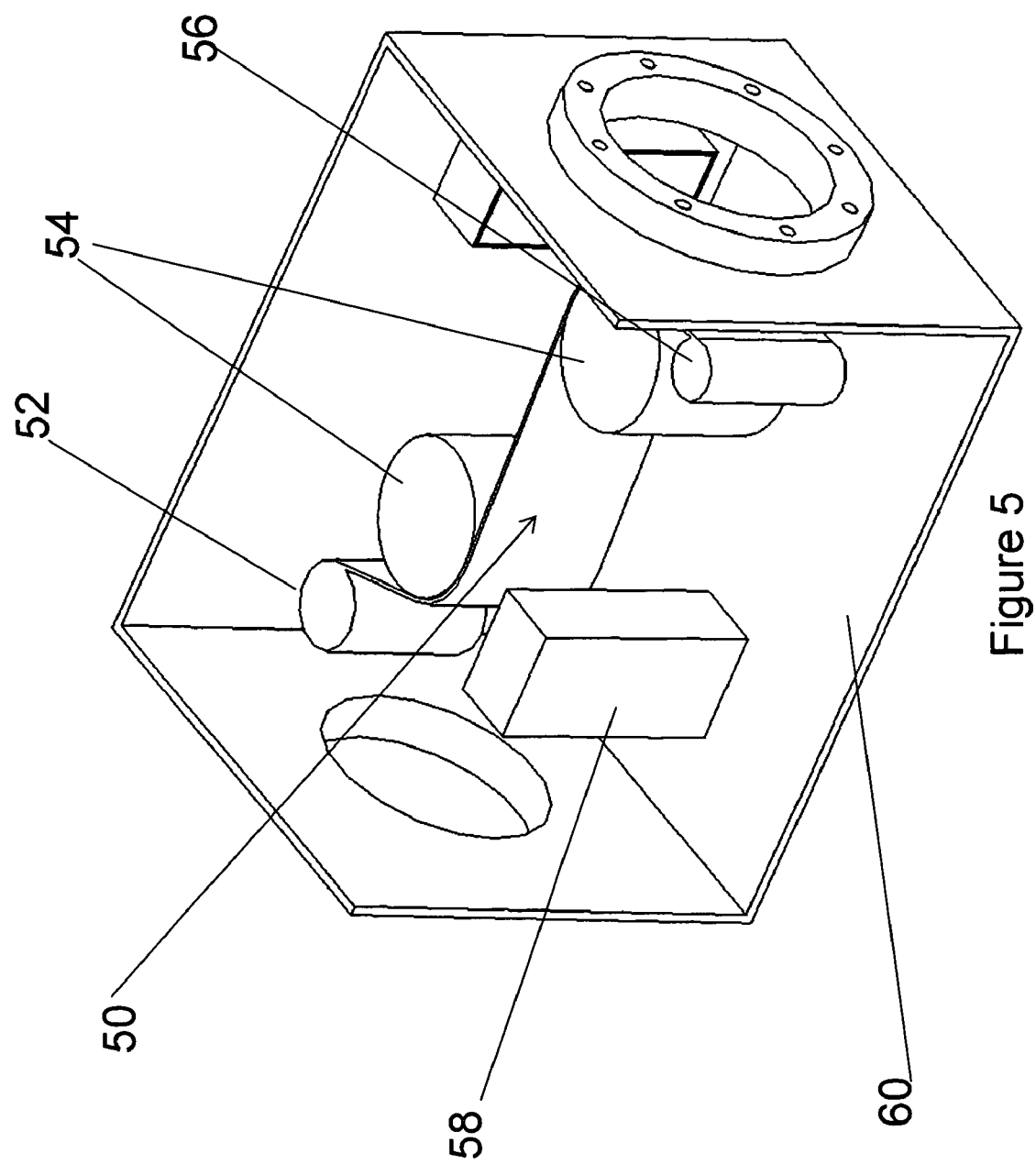
FIG. 5 is a perspective view of apparatus for forming oxide dielectric films.

Preferably both sides of the substrate are coated with dielectric using a standard reactive sputtering process in a commercial reel-to-reel sputter deposition system such as shown in FIG. 5, where a two-source deposition system is illustrated. RF power or pulsed-DC power in the range from around 500 watts to 5 kilowatts may be used. Preferably a power of 1000 to 2000 watts is used. A film thickness between 0.5 and 2 micrometers may be formed on both sides of the conducting substrate, but other thicknesses may be used. Preferably, two dielectric coated substrates are placed on top of each other and wound into a cylinder to form a capacitor.

Preferred dielectrics include amorphous silicon dioxide ($SiO_2$) and hafnium dioxide ($HfO_2$) formed by reactive gas sputtering. Alternatively, amorphous $SiO_2/Si_3N_4$ multi-layers or other nitride/oxide combinations may be formed on each side of the substrate. Preferably the deposition temperature is between 0° C. and 200° C. with a growth rate of 0.5 to 200 micrometers per hour. Alternate deposition methods include deposition at higher powers of up to several thousand watts. Pulsed DC power or RF power may be used to generate the sputtering plasma. Alternately chemical vapor deposition or other deposition methods may be used. Preferably, the film is sufficiently flexible to be wound into a cylindrical capacitor shape.

The following experiments were performed to select preferable dielectrics and preferable growth conditions. These processes and conditions could be modified slightly by a person skilled in the art to achieve similar results and as such, these processes and conditions are provided only as examples. A commercially available CVC 601 sputter deposition system was used to deposit all metal and dielectric films. To evaluate the quality of the dielectric materials, dielectric films were grown on nickel-coated (~0.1 micrometer thick) 1-inch×2-inch borosilicate glass substrates using the CVC 601 deposition system. After attaching the nickel-coated glass substrate to a sample holder, the CVC 601 deposition system was subsequently closed and evacuated to a pressure below $2\times10^{-6}$ Torr. The glass substrate was then heated to approximately 100° C. for 10 minutes to decontaminate ("de-gas") the substrate. Next, a thin layer (~100 nm) of titanium was sputter-deposited on the nickel-coated glass substrate to aid in the adhesion of the dielectric. Typical titanium sputter deposition conditions were 30 standard cubic centimeters per second (sccm) Argon, 5 millitorr pressure and 200 Watt RF power. The amorphous silicon dioxide film was then deposited onto the substrate by sputtering a Si target in an argon/oxygen background gas. Typical sputtering conditions were 750 Watts RF at a flow rate of 21 sccm Argon and 9 sccm oxygen. Typically, deposition times were 90 minutes. The overall system pressure was maintained at 5 milliTorr and the sample-to-source distance was maintained at approximately 15 cm during the depositions. Other dielectric oxides were deposited in a similar manner by sputtering a metal target in an argon/oxygen background gas. After the dielectric film was deposited, the system was then vented and the thickness of the oxide film was measured using standard optical interferometry, which is well known in the art.

To characterize the properties of the dielectric films, 2 and 4 mm diameter nickel dots ("test sites") were deposited on the surface of the dielectric. The metal test site deposition process included: placing a shadow mask containing holes on the dielectric-coated substrate, placing the assembly in the CVC 601 vacuum chamber, pumping down to a pressure lower than $2\times10^{-6}$ Torr, heating to 100° C. for two minutes to de-gas the sample, depositing a ~100 nm titanium film to aid in adhesion, and then depositing a ~0.1 micrometer thick nickel film using 300 Watts DC power for five minutes. The nickel test sites were grown at 5 millitorr pressure using an argon gas flow of 30 sccm.

In order to optimize the growth process, experiments investigated the effect of pressure and the ratio of oxygen to argon in the sputter gas on the breakdown strength on the amorphous oxides. A set of amorphous $SiO_2$, $TiO_2$, and $ZrO_2$ films were sputter-deposited on metal-coated glass films using a RF magnetron operating between 500 Watts and 750 Watts. Most of the films were grown at pressures ranging between 3 and 10 milliTorr and oxygen to argon ratios ranging between 0.1 and 0.5. Amorphous $HfO_2$ films were grown at slightly lower powers using a smaller target. All of the films were grown with a sputter system. The film thickness ranged from 0.1 micrometers to 5 micrometers.

The capacitance of the dielectric materials under the nickel test sites was measured for two AC frequencies: 100 kHz and 1 MHz, and with an applied DC bias between −20 and 20 VDC using a Keithley 595 capacitance meter. These measurements were used to determine the dielectric constant of the film. The breakdown voltage of the test sites was found by making current vs. voltage (I-V) curves at the test sites. This was done by placing a probe tip on a test site, then measuring the current going through the dielectric as a function of applied voltage. The dielectric breakdown voltage was determined to be the applied voltage when the leakage current had a sudden change, typically from currents less than a microampere to over a milliampere. Additional dielectric-strength measurements were made by touching the bare dielectric between test sites with a probe tip and measuring the leakage current until breakdown occurred. Typically, the breakdown voltage of the small test sites and breakdown voltage when touching the probe tip on the dielectric showed large differences, indicating that the dielectrics fabricated had good intrinsic breakdown properties but a large number of defects from background contamination. In future experiments, growth can be done in a clean room environment to eliminate much of the contamination. A summary of the dielectric performance results for a number of potential materials is given in Table 1. Breakdown strengths are for the probe tip touching the bare dielectric.

TABLE I

Summary of Dielectric Performance

| | $SiO_2$ | $TiO_2$ | $ZrO_2$ | $HfO_2$ |
|---|---|---|---|---|
| Growth rate at 750 W | 1μ/hr | 0.2μ/hr | 0.5μ/hr | .72μ/hr @260 W |
| Breakdown strength | >800 V/μ (variations) | Poor | ~220 V/μ (variations) | ~400 V/μ (variations) |
| Temperature stability | Excellent | | | |
| Adhesion | Good | Poor | Good | Good |
| Film type (die const) | Amorphous (k~4.9) | Poly (k > 80 var) | Poly (k > 25 var) | Nano (K~25) |
| Flexibility | Good | Poor | | Good |

From examination of Table 1, it was determined that $SiO_2$ had the best dielectric breakdown properties (greater than 800 volts per micrometer). $HfO_2$ appeared to also have high breakdown strength. $TiO_2$ films grown under these conditions had poor breakdown strength and varying dielectric constant indicating deposition of varying domains of $Ti_xO_y$ instead of $TiO_2$. $ZrO_2$ had intermediate dielectric breakdown but again had variations in the dielectric constant across the surface.

Optical examination of both the $SiO_2$ and $HfO_2$ films showed that they were smooth with consistent dielectric constants across a single film and from one film to another. X-ray diffraction data showed that the $SiO_2$ films were truly amorphous and the $HfO_2$ films were nanocrystalline. X-ray data from $ZrO_2$ and $TiO_2$ showed that these films were polycrystalline.

The capacitance of the $SiO_2$ and $HfO_2$ amorphous dielectric materials under the test sites was measured at 100 kHz and 1 MHz, with a simultaneously-applied DC bias voltage between −20 and 20 VDC. The capacitance did not significantly change with frequency or bias voltage. The measured capacitance, and thus the dielectric constant, of both films were very consistent for all deposition conditions. Both the $SiO_2$ and $HfO_2$ films had dielectric constants consistent with the literature of 4.5 and 25, respectively.

The capacitance of the $TiO_2$ and $ZrO_2$ samples was measured with a simple capacitance meter. The capacitance for identical test sites varied considerably, depending on deposition conditions and position of the site. This variation indicates a growth-parameter dependence of the dielectric constant and the formation of distinct domains during growth. For both the $TiO_2$ and $ZrO_2$ films, the capacitors indicate a dielectric constant that was well in excess of the most commonly reported dielectric constraint in the literature (80 for $TiO_2$ and 25 for $ZrO_2$). In addition, the $TiO_2$ dielectric films had poor adhesion and poor dielectric strength.

Additional measurements were made to determine the thermal performance of the $SiO_2$ film. The capacitance of a 2 mm diameter nickel test site was measured as a function of temperature from 25° C. to 360° C. Capacitance was measured from −20 to 20 VDC bias at a frequency of 100 kHz. The measured capacitance was stable up to a film temperature of 360° C., which was the limit of the heater.

In subsequent tests, the best-performing dielectric, $SiO_2$, was deposited on a flexible aluminum-coated polymer substrate manufactured by Steinerfilm, in order to assess its ability to be wound into a cylindrical shape necessary for optimal volumetric energy density. Initial experiments showed that the metal-coated polymer substrate must be cooled to below 150-200° C. during deposition to avoid crazing of the film during deposition. When the substrate was kept at near room temperature, there was no indication of crazing on the metallized polymer substrates during sputter deposition of the $SiO_2$ dielectric.

The flexibility of the amorphous $SiO_2$ dielectric film was measured by sputter-depositing amorphous $SiO_2$ on a flexible aluminum-coated polymer substrate. Again, this example serves as only one possible fabrication technique and slight modifications to the process would yield the same outcome. A 0.7 micrometer thick amorphous $SiO_2$ dielectric film was deposited sequentially on both sides of the substrate. During deposition the substrate was retained at near room temperature to insure high quality of the film and substrate. After growth, there was no indication of cracking or crazing.

After inspection, the dielectric-coated film was wrapped around a ⅜-inch diameter mandrel, and then placed in a scanning electronic microscope. The coated substrate extended past the end of the mandrel in order to examine the dielectric film-substrate interface. The $SiO_2$ film showed no cracking except in areas where the film was damaged during insertion into the electron microscope. A 30-× magnification photograph showed that the film did not crack during the winding of the capacitor. These tests showed that the amorphous $SiO_2$ films could be rolled into a cylindrical shape suitable for capacitors without damaging the dielectric.

Studies were made to determine the minimum winding radius of the dielectric material. Amorphous $SiO_2$ coated substrates were wound around mandrels of varying diameters ranging from ⅛-inch to ½-inch in diameter. After winding, the film was unwound and inspected with an optical microscope. The large diameter samples did not show indications of cracking after being wound around the mandrel. Only samples wound around a ⅛-inch mandrel were cracked when unwound and inspected. The cracking was primarily on the outside of the films, indicating that tensile stress during winding onto a small diameter mandrel may be the cause of this problem. Control of stress in the film under varying growth pressure is expected to help control the problem.

As an example, dielectric-coated anodes were wound into a cylindrical capacitor such as shown in FIG. 3. Capacitance was measured to be 6.5 nF, which is reasonable for a $SiO_2$ coated anode approximately 7 cm² in area. Breakdown tests showed a failure at a voltage of less than 100 volts when a mandrel size of ⅛-inch diameter was used; however, tests performed using mandrels larger than ¼-inch showed breakdown strengths in the 100's of volts. These breakdown strengths are lower than predicted. Minimization of defects caused by particle contamination and higher breakdown voltages can be accomplished by placing the deposition system in a clean room environment.

A suitable growth system for the production of the material of this invention is shown in FIG. 5. This system can coat both sides of a metallized polymer substrate and at the same time keep the substrate cool during deposition. The system should have a pre-clean stage and should be housed in a clean room environment. Such systems are commercially available. Typical commercial systems are capable of coating a 1-18-inch wide flexible substrate on both sides with amorphous dielectric films such as $SiO_2$ to a thickness on the order of 0.5-2 micrometers.

Referring to FIG. 5, metallized polymer film 50 or other substrate is furnished from roller 52 and passes over water-cooled rollers 54 to take-up roller 56. Magnetrons 58 furnish power for the plasma in chamber 60.

Using 1-micrometer thick $SiO_2$ films on a 1-micrometer thick substrate is expected to result in a maximum energy density of 14.5 Joules/cm³. This energy density is a factor of 3- to 4-times greater than state-of-the-art capacitors.

Although the present disclosure has been described in detail, it should be understood that various changes, substitutions and alterations can be made thereto without departing from the scope and spirit of the invention as defined by the appended claims.

The invention claimed is:

1. A sheet of material for forming a wound capacitor, comprising:
   a flexible substrate comprising a polymer film having a metal coating on each side of the polymer film;
   a flexible dielectric layer of oxide or nitride on at least a portion of the metal coating, the layer having a thickness greater than 0.1 micrometers; and
   a conducting wire attached to the metal coating.

2. The flexible substrate of claim 1 wherein the polymer film is comprised of polypropylene, polystyrene, polyimide, polysulfone or polyester.

3. The flexible substrate of claim 1 wherein the metal coating is comprised of aluminum.

4. The dielectric layer of claim 1 wherein the layer is comprised of amorphous or nanocrystalline silicon oxide or nitride.

5. The layer of claim 1 wherein the layer is comprised of amorphous or nanocrystalline hafnium oxide.

6. The layer of claim 1 wherein the layer is comprised of titanium oxide or zirconium oxide.

7. The layer of claim 1 wherein the layer is comprised of alternating layers of amorphous or nanocrystalline nitrides and oxides.

8. The layer of claim 1 wherein the layer is comprised of silicon nitride.

9. The layer of claim 4 wherein the layer of amorphous or nanocrystalline oxide or nitride has dielectric breakdown strength greater than about 400 volts/micrometer.

10. The layer of claim 1 wherein the nitride is composed of aluminum nitride or gallium nitride.

11. Method for making a flexible material for a wound capacitor, comprising:
    providing a flexible substrate comprising a polymer film having a metal coating on each side of the polymer film;
    depositing a layer of an oxide or nitride on a portion of the metal coating; and
    attaching an electrical conductor to the metal coating.

12. The method of claim 11 wherein the layer of oxide or nitride is deposited by reactive sputter deposition.

13. The method of claim 11 wherein the oxide or nitride layer is deposited by a sputtering, e-beam or chemical vapor deposition.

14. The method of claim 11 further comprising cooling the substrate during deposition of the layer.

15. The method of claim 14 wherein the substrate is cooled to a temperature in the range of room temperature.

16. The method of claim 14 wherein the substrate is cooled to a temperature less than about 200° C.

17. The method of claim 14 wherein the substrate is cooled to a temperature less than about 100° C.

18. A capacitor for storing electrical energy comprising a plurality of sheets of the material of claim 1 wound in a spiral.

19. The capacitor of claim 18 wherein the number of sheets of the material of claim 1 wound in a spiral is two.

* * * * *